United States Patent
Singh et al.

(10) Patent No.: US 9,749,679 B2
(45) Date of Patent: Aug. 29, 2017

(54) METHOD FOR EFFICIENT PROCESSING OF BTP ENABLED MPEG4 STREAM

(71) Applicant: ARRIS Enterprises, Inc., Suwanee, GA (US)

(72) Inventors: Virendra Singh, Bangalore (IN); Ajit Kumar, Bangalore (IN); Belmannu Harekrishna Acharya, Bangalore (IN); Lakshmi Arunkumar, Bangalore (IN); Sista Sarada Sastry, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/989,189

(22) Filed: Jan. 6, 2016

(65) Prior Publication Data

US 2016/0198216 A1 Jul. 7, 2016

Related U.S. Application Data

(60) Provisional application No. 62/100,122, filed on Jan. 6, 2015.

(51) Int. Cl.
*G11B 27/00* (2006.01)
*H04N 5/783* (2006.01)
(Continued)

(52) U.S. Cl.
CPC ....... *H04N 21/4343* (2013.01); *G11B 27/005* (2013.01); *H04N 5/783* (2013.01);
(Continued)

(58) Field of Classification Search
CPC ........... H04N 21/2387; H04N 21/4333; H04N 21/47205; H04N 21/47217;
(Continued)

(56) References Cited

U.S. PATENT DOCUMENTS

2003/0169815 A1  9/2003  Aggarwal et al.
2005/0031308 A1  2/2005  Fu et al.
(Continued)

FOREIGN PATENT DOCUMENTS

| EP | 1148728 A1 | 10/2001 |
| WO | 01/26375 A1 | 4/2001 |
| WO | 03/024113 A1 | 3/2003 |

OTHER PUBLICATIONS

PCT Search Report & Written Opinion, Re: Application No. PCT/US2016/012331, dated Jun. 1, 2016.
(Continued)

*Primary Examiner* — Benjamin R Bruckart
*Assistant Examiner* — Anthony Bantamoi
(74) *Attorney, Agent, or Firm* — Thomas A. Ward

(57) ABSTRACT

A system is provided for providing a trickplay operation using a digital video recorder (DVR) when the video includes Broadcom Transport Packets (BTPs) designed for MPEG-2, but in an MPEG-4 video steam. In a first embodiment, to enable trickplay to function properly with MPEG-4 video, the BTP descriptors included with each group of data frames are disabled so that a single descriptor provided without BTPs that would otherwise be provided in MPEG-4 is all that remains. In a second embodiment, the 5 descriptors for MPEG-4 are combined into a single descriptor. In a third embodiment, the pace of decoding of the MPEG-4 descriptors is increased so that the speed of encoding all the 5 descriptors is comparable to the pace of decoding a single MPEG-2 descriptor.

8 Claims, 5 Drawing Sheets

(51) Int. Cl.
*H04N 21/434* (2011.01)
*H04N 21/4147* (2011.01)
*H04N 21/2387* (2011.01)
*H04N 21/6587* (2011.01)
*H04N 21/432* (2011.01)
*H04N 21/426* (2011.01)
*H04N 9/804* (2006.01)
*H04N 21/44* (2011.01)
*H04N 7/01* (2006.01)

(52) U.S. Cl.
CPC ....... *H04N 9/8045* (2013.01); *H04N 21/2387* (2013.01); *H04N 21/4147* (2013.01); *H04N 21/42607* (2013.01); *H04N 21/4325* (2013.01); *H04N 21/6587* (2013.01); *H04N 7/0127* (2013.01); *H04N 21/44008* (2013.01)

(58) Field of Classification Search
CPC .............. H04N 21/6587; H04N 5/783; G11B 2020/10981; G11B 2020/1099; G11B 27/005
See application file for complete search history.

(56) References Cited

U.S. PATENT DOCUMENTS

2008/0120637 A1* 5/2008 Deiss .................... H04N 5/783
 725/32
2008/0127260 A1* 5/2008 Hong ................. H04N 7/17318
 725/39

OTHER PUBLICATIONS

S. Dutta, et al., "Smart video streams: 101 uses of the user data field in MPEG", Conference Record of the Asilomar Conference on Signals, Systems and Computers, IEEE Computer Society Press, vol. 2, Oct. 30, 1995., pp. 1462-1466.

* cited by examiner

METHOD FOR EFFICIENT PROCESSING OF BTP ENABLED MPEG4 STREAM

CROSS REFERENCE TO RELATED APPLICATION

This Application claims priority under 35 U.S.C. §119(e) from earlier filed U.S. Provisional Application Ser. No. 62/100,122 filed on Jan. 6, 2015 and incorporated herein by reference in its entirety.

BACKGROUND

Technical Field

The present invention relates to a process for providing trickplay operations, such as rewind and fastforward, with a system that uses Broadcom Transport Packets (BTP) with more recent video standards than MPEG2 for which the BTPs were designed.

Related Art

Digital Video Recorder (DVR) capable set top boxes can record content for viewing at a later time. The recorded content can be skipped, Fast Forwarded (FF) or Rewound (REW) at different speeds, together known as trickplay operations. The recorded content could be of any format like MPEG2 or MPEG4. Introducing new format types brings in advantages as well as complications into the editing system.

Complications that are brought in when a new format is adopted can be seen in the case of introduction of MPEG4. System-on-a-Chip (SoC) provider Broadcom (BCM) makes SoCs used in set top boxes that are DVR capable. Broadcom uses their concept of "Broadcom Transport Packet" (BTP) to support trickplay of a MPEG2 transport stream. The BTP is used for accurate identification of I frames with MPEG2. The BTP packets are required to reliably identify the beginning and the end of each I Frame in order to provide accurate decoding of a video stream. The BTP I frame identification was originally designed for MPEG2, so the change to MPEG4 introduced problems.

A problem exists because, unlike with MPEG2, MPEG4 I frame data is interspersed between BTP packets. This change introduced a challenge to adapt the firmware design and algorithm to handle MPEG4 BTP video streams successfully with existing formats.

The adaptation for MPEG4 interspersing of I frame data between BTP packets resulted in problems, including: (1) a need for additional disk read operations. (2) More processing required to format the frame data to include the BTPs at appropriate offsets. (3) Introduction of overhead in data size to accommodate the BTP per frame. The overhead data had a direct impact on media clients, as they source data from the DVR hub/gateway device and handle the additional data sent across the network. The added overhead data resulted in significant added latency to the I frame processing and delivery to the decoder.

The result of the overall added latency is that DVR trickplay operations can be slow and choppy with MPEG4 relative to MPEG2. Fastforward speeds are not likely within acceptable thresholds. In some cases the 2× fastforward could take as long as the normal play speed of 1×. Accordingly, it is desirable to provide other methods to handle dispersement of BTP packets that are encoded in formats more recent than MPEG2 to avoid the problems discussed above.

SUMMARY

Embodiments of the present invention provide a system for handling trickplay operations when more recent transmission standards are used than MPEG2, namely when MPEG4 is used.

The embodiments of the present invention were identified based on recognition that with the BTP used in MPEG2, the SOC frame format has only one descriptor, available for each I frame of data. Descriptors are variable length elements that add standards-defined or user-defined elements to transport streams for MPEG2 or MPEG4, such elements including BTPs. With the BTP used in MPEG4, each I frame data includes 5 descriptors:

1. Startcode
2. BTP0
3. SPS (Sequence Parameter Set)/PPS (Picture Parameter set) for the I frame
4. BTP1+Frame Data (excluding a last Transport Stream (TS) packet)
5. BTP2+Frame Data (last TS packet).

In light of this information, three solutions were provided in accordance with embodiments of the present invention to better enable trickplay operations with MPEG4.

The first solution is to disable the BTP mechanism so that only 1 descriptor is used in MPEG4. This effectively keeps only the third SPS/PPS descriptor along with the frame data of descriptors 4 and 5 listed above, and the startcode of descriptor 1, all part of a single combined descriptor. With the size of most SPS/PPS being small, or not less than 1 TS packet payload, the SPS/PPS and I frame data stay in 1 TS packet. However, in some cases with the size of the SPS/PPS and I frame data are separated by an encoder into 2 separated TS packets.

In a second solution, the frame data with the BTP format having 5 descriptors is combined into 1 descriptor to fit into the MPEG4 architectural framework. The algorithm for this second solution has the following steps. (1) Obtain the descriptors from the SoC processor. (2) Prepare a single descriptor framework, including accommodating 5 descriptors in the required offset positions as defined in the Broadcom BTP format. (3) Read the entire frame data from memory disk with a single read, avoiding a need for three disk read operations. (4) Insert the data from steps 2 and 3 into a single descriptor framework. (5) Send this data over a network to a client, and (6) continue to prepare and send data using the steps 1-5 to a client where it is passed to a decoder via a playback driver for presentation. The preceding algorithm steps can be performed without impacting system dynamics.

In a third solution, the SoC processor is configured to send data to a decoder in a controlled pace. This pacing in one embodiment is computed based on a single descriptor. In essence the descriptor pacing is set so that processing of each descriptor can be faster and frame data reaches the client similar to the time for an MPEG2 stream, or an MPEG4 stream with the BTP disabled. The challenge of pacing is to achieve the pacing without impacting ongoing DVR sessions on a set top box or otherwise changing system dynamics so that the DVR trickplay operation occurs without error.

BRIEF DESCRIPTION OF THE DRAWINGS

Further details of the present invention are explained with the help of the attached drawings in which.

DETAILED DESCRIPTION

Figure 1:
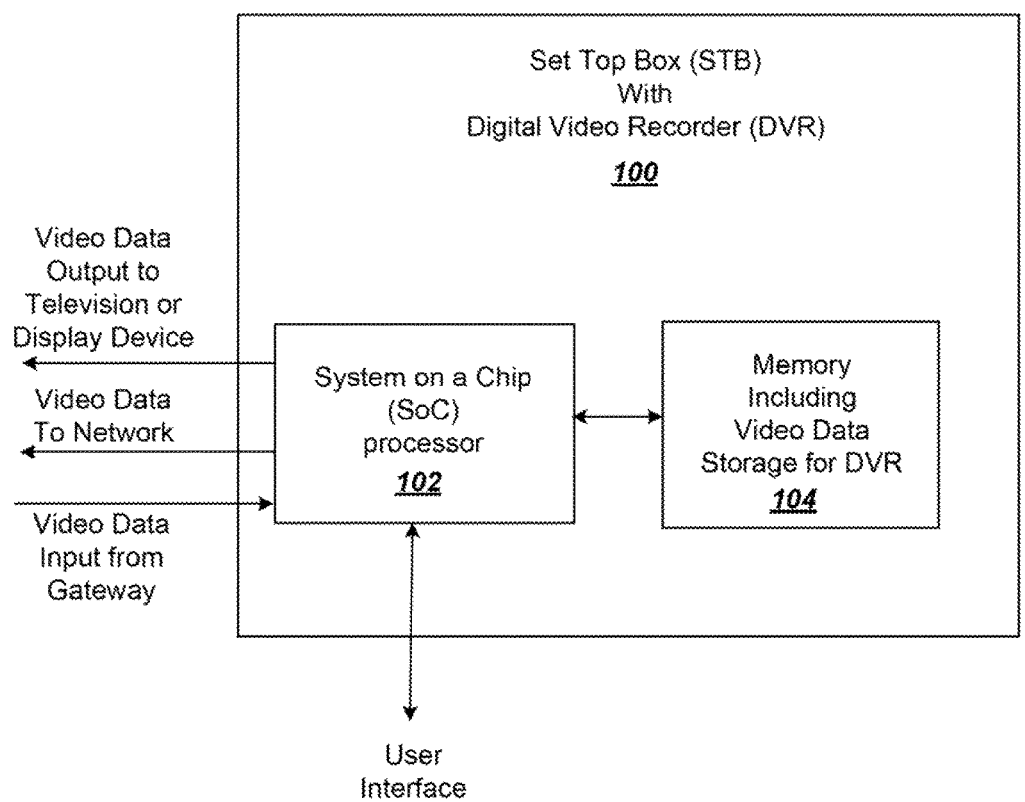
FIG. 1 shows components of a STB with a DVR that can operate according to embodiments of the present invention to provide trickplay operations.

FIG. 1 shows components of a STB with a DVR 100, wherein the STB 100 can operate according to embodiments of the present invention to provide trickplay operations. The STB 100 includes a BCM System on a Chip (SOC) 102 that has a processor to receive video data provided from a gateway server. Although the SoC 102 is identified as a BCM device, other SoCs can be used that operate according to a BCM format that can use BTP descriptors. The video received is then stored in the DVR memory 104. The video can then be played back when a request is received from a user interface provided to the SoC 102 which requests a video from the DVR 104. The SoC 102 can include a decoder to receive the data from DVR memory 104 and decode the data for providing on a video data output to a television or other video display device, or simply sending the video over a network connection so it can be received by a video player device. During playback, a trackplay operation can be requested from the user interface at the SoC 102. The SoC 102 then obtains the video data for playback from the memory 104 and provides processing to perform the trickplay operation.

The SoC 102 of FIG. 1 can include a processor that connects to the memory 104 to enable operation. In addition to storing video code, the memory 104 can store code that is executable by the processor on the SoC 102 to enable the SoC to perform the processes described herein. Although described with the memory 104 providing storage of code for the SoC 102, the memory can be provided separate from DVR memory and included in the SoC 102 or a separate memory.

Figure 2:
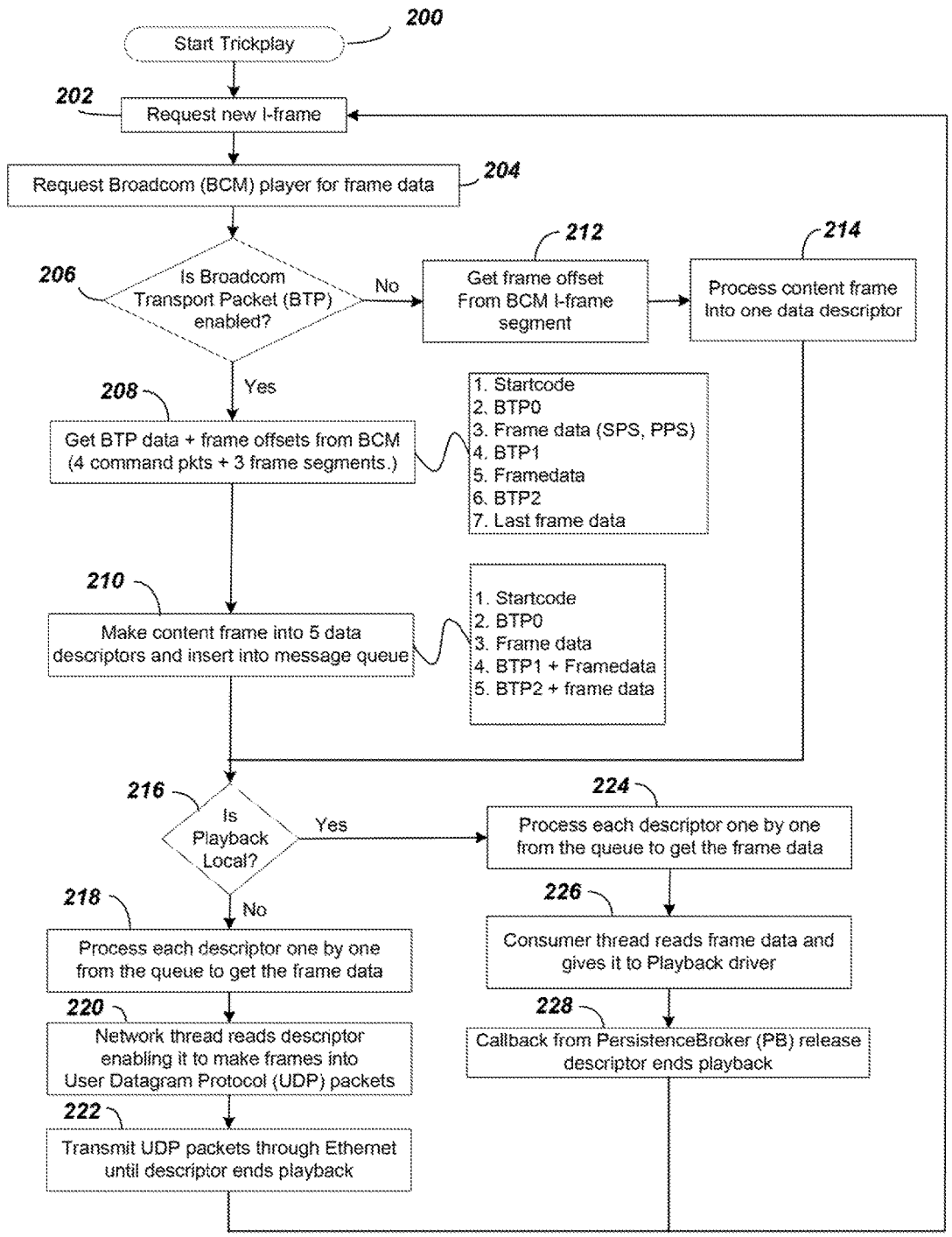
FIG. 2 is a flowchart showing a process for trickplay operation with video data using BTPs previously provided in MPEG-4.

FIG. 2 is a flowchart showing a process for trickplay operation using BTPs previously provided in MPEG-4 that can be provided with the STB system shown in FIG. 1. The process begins at step 200 where a user requests a trickplay operation. In step 202, I-frames are obtained from memory one at a time to accomplish the trickplay operation. In step 204 the BCM player on a SoC is invoked to process the frame data.

In step 206, the process checks to see if BTPs are used in the operation. If not, in step 212 the system gets the frame offset from the BCM I-frame segment and in step 214 obtains the one data descriptor and proceeds with operation to step 216. If the operation in step 206 determines BTPs are used, the system in step 208 gets the BTP data. This includes commands and 3 frame segments labeled 1-7 in the list shown to the side of step 208. The list includes: 1. A startcode; 2. The first BTP descriptor BTP0; 3. Frame data including SPS and PPS; 4. The second BTP descriptor BTP1, 5. Additional frame data; 6. The third BTP descriptor BTP2; and finally 7. The last frame data. Next, in step 210 for previous MPEG-4 systems, the 7 segments are combined into 5 descriptors shown to the side of step 210. The descriptors are effectively combined so that items 4-5 of step 208 are combined into a BTP descriptor with frame data, while items 6-7 are combined into a BTP descriptor with frame data. With the 5 descriptors per data frame, operation proceeds to step 216.

Step 216 provides for direct playback using two process paths, depending on whether playback is local or performed over a network. If the playback is done locally, each of the five descriptors is processed one by one in step 224, and then a consumer thread provided with the SoC that is local reads the frame data and provides it through a playback driver for decoding in step 226. For the operation of step 224, three disk reads are needed for each data frame. Once the data is played back according to the user interface command, in step 228 a callback from the PersistenceBroker (PB) release descriptor will be read that releases the playback operation.

If in step 216 the playback is not local, operation still proceeds with each of the five descriptors being processed one by one in step 218. Each message in the queue is processed with a fixed frame delay and a total of three reads to disk or memory is made for each frame. Next in step 220, since operation is not local, but over a network, a network thread provided to the SoC reads the descriptors enabling it to make the frames into User Datagram Protocol (UDP) packets. The UDP packets are then transmitted in step 222 through an Ethernet connection for playback until a descriptor is received that ends the trickplay operation. From either step 222 that occurs in network mode, or step 228 occurring in a local playbook mode, if trickplay is not ended, operation proceeds back to step 202 to obtain new I-frames until playback is complete.

Figure 3:
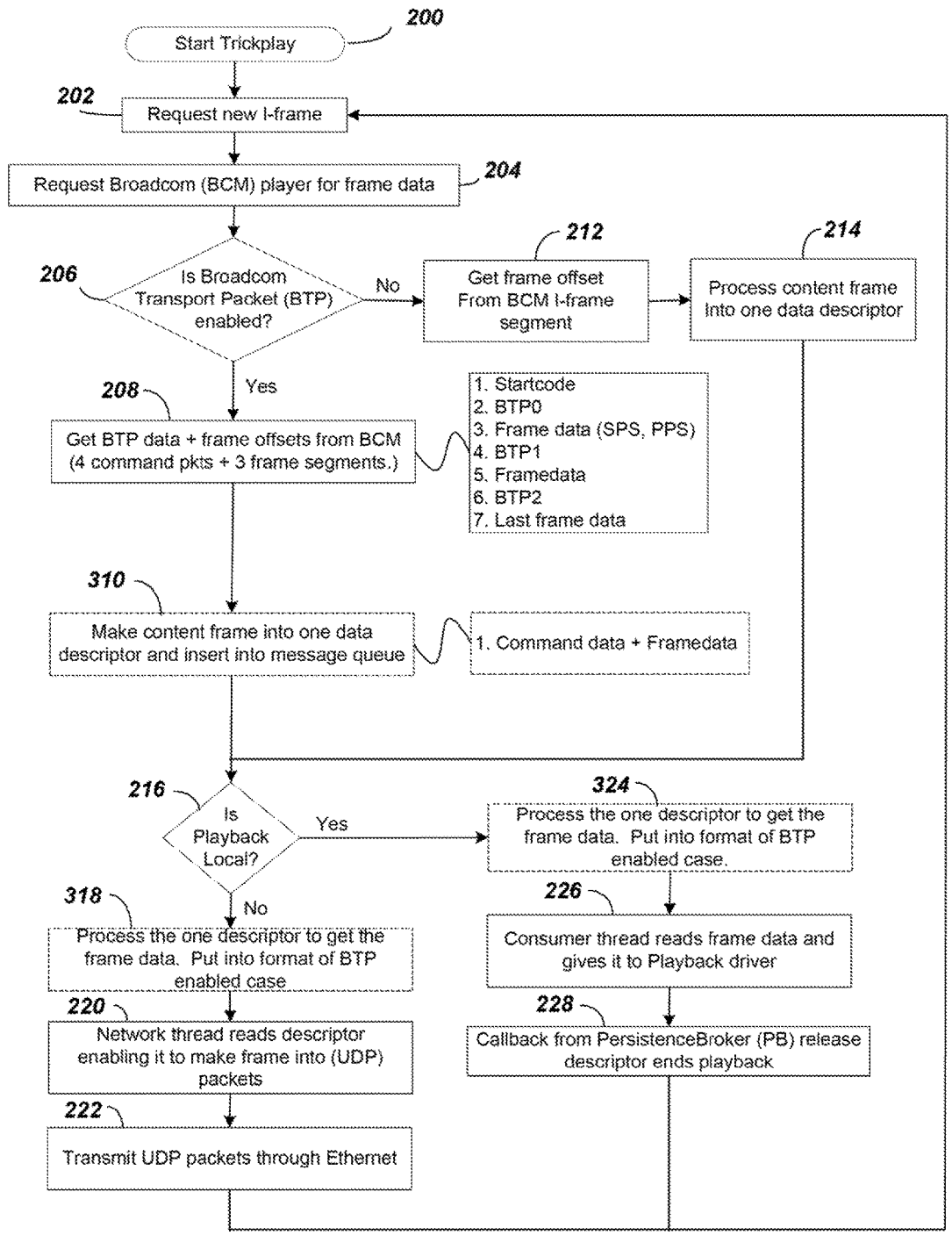
FIG. 3 shows modifications to the flowchart of FIG. 4 showing a process for trickplay operation with BTPs provided in MPEG-4 according to embodiments of the present invention.

FIG. 3 shows modifications to the flowchart of FIG. 2, including showing a process for trickplay operation with BTPs provided in MPEG-4 according to embodiments of the present invention. Steps carried over from FIG. 3 that are the same in FIG. 2 are similarly numbered. The new steps are also shown with dashed lines.

In FIG. 3, operation proceeds as in FIG. 2 through step 208 where 7 descriptors including 4 command packets and 3 frame packets are received. A first difference is provided in the next step 310, however, where instead of simply narrowing to 5 descriptors as in previous step 210, the commands and frame segments are combined into a single descriptor. Further, changes are made with steps 318 and 324, depending on whether playback is local or network operated. In both the steps 318 and 324, only a single descriptor needs to be processed, differing from the previous process steps 218 and 224 where five descriptors had to be processed one by one. Further, in steps 318 and 324, the frame data processing is formatted as BTP enabled data. A further difference in the steps 318 and 324 is that each message is processed with only one read to disk or memory for each frame of data, unlike the three disk reads of steps 218 and 224 previously used.

As indicated previously herein, three different embodiments of the present invention, subsequently identified as embodiments 1-3, are provided to enable operation in MPEG-4 when trickplay operations are requested and the data is BTP formatted. In embodiment 1, the BTPs are simply disabled and the descriptors are then processed as single combined descriptor. In embodiment 2, the BTPs remain, but the 7 descriptors and frame data received in MPEG-4 are combined into a single descriptor and processed. This embodiment 2 is illustrated in FIG. 3. In embodiment 3 the pace of process of the descriptors are increased so that the processing time is similar to the processing of a single descriptor in MPEG-3. An additional embodiment can be provided with a combination of embodiments 2 and 3.

Figure 4:
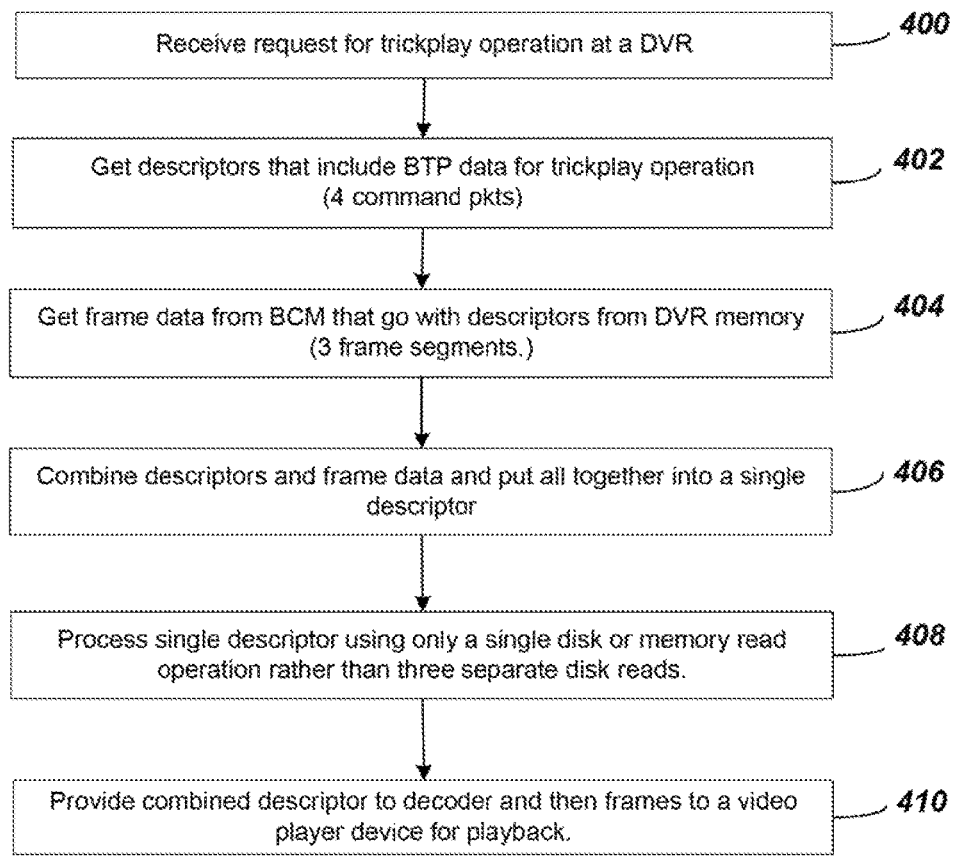
FIG. 4 is a flowchart showing details of specific steps of an embodiment of the present invention that differ from previous processes.

FIG. 4 is a flow chart showing more details of embodiment 2, in addition to those steps described with respect to FIG. 3. In FIG. 4, operation proceeds with receipt of the trickplay operation request in step 400. Next in step 402, the BTP data descriptors for each frame are received, including 4 command data per frame. Next in step 404, the frame data that goes with the descriptors is retrieved from the DVR memory. In step 406 the descriptors and frame data collected in steps 402 and 404 are combined into a single descriptor. Next in step 408, the single descriptor is processed using only a single memory read operation, unlike the three disk read operations used in current practice. Finally in step 410, the video frames with the descriptor are provided to the decoder and then the decoded data is sent to the video player device for playback.

Figure 5:
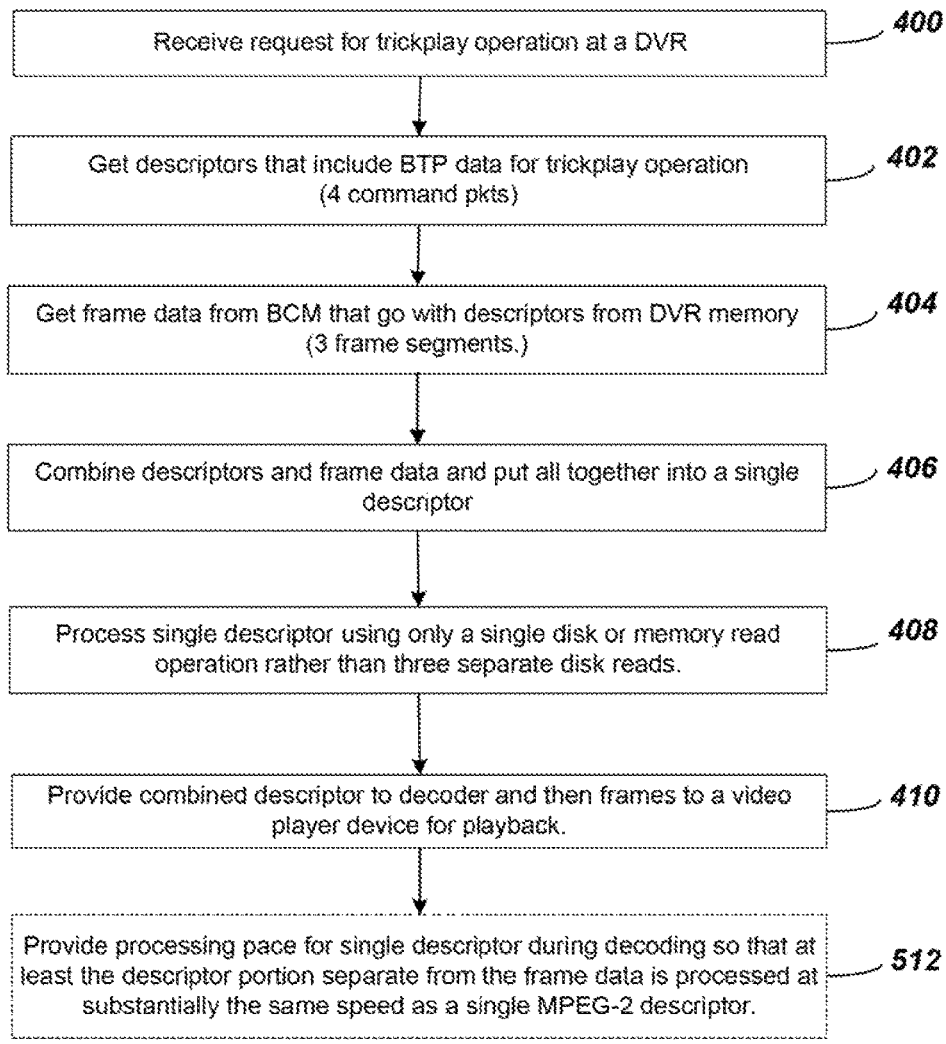
FIG. 5 shows modifications to the flowchart of FIG. 4 to add steps for pacing according to further embodiments of the present invention.

The system of embodiments 1 and 3 have simple steps, so additional flowcharts are not used to describe them. However because a combination of embodiments 2 and 3 is believed a significant improvement over the prior art, FIG. 5 is provided to show modifications to the flowchart of FIG. 4 to add the step for pacing according to embodiment 3. FIG. 5 includes all the same steps of embodiment 2 as in FIG. 4, and they are carried over and labeled the same in FIG. 5. FIG. 5 adds the step 512 that includes embodiment 3, namely providing a processing pace for the single descriptor during decoding so that the descriptor portion, separate from the frame data, is processed at substantially the same speed as a single MPEG-2 descriptor.

Although the present invention has been described above with particularity, this was merely to teach one of ordinary skill in the art how to make and use the invention. Many additional modifications will fall within the scope of the invention as that scope is defined by the following claims.

What is claimed:

1. A method for providing a trickplay operation using a digital video recorder (DVR) comprising:
    receiving a request for a trickplay operation at the DVR;
    obtain a plurality of descriptors for the requested trickplay operation from the DVR, wherein the plurality of descriptors include Broadcom Transport Packets (BTPs), wherein the plurality of descriptors further comprise:
    a startcode descriptor;
    a first BTP descriptor BTP0;
    a Sequence Parameter Set (SPS)/Picture Parameter Set (PPS) descriptor:
    a second BTP descriptor BTP1;
    first frame data excluding a last transport stream (TS) packet for the associated frame data;
    a third BTP descriptor BTP2; and
    second frame data including the last TS packet for the transport stream;
    prepare a single descriptor framework that combines the plurality of descriptors into a single combined descriptor;
    read frame data from memory of the DVR in a single memory read operation;
    combine the read frame data into the single combined descriptor; and
    provide the single combined descriptor through a decoder for playback on a video player device.

2. The method of claim 1, wherein the descriptors comprise a plurality of BTP descriptors and a Sequence Parameter Set (SPS)/Picture Parameter (PPS) descriptor.

3. The method of claim 1, wherein the trickplay operations are provided for data encoded using the MPEG-4 standard.

4. The method of claim 1, further comprising:
    decoding using the decoder while altering decode processing speed so that descriptors are processed with a pace higher than remaining data, so that descriptors for each group of frame data are processed with a speed similar to a pace of processing a single MPEG-2 standard format descriptor.

5. An apparatus for providing trickplay operations for recorded video comprising:
    a Digital Video Recorder (DVR) memory for storing video data;
    a System on a Chip (SoC), comprising:
    a processor that connects to the DVR for obtaining video data from the DVR memory;
    a decoder for decoding video data obtained from the DVR memory and providing the decoded data for playback on a video player device; and
    a memory for storing code that is executable by the processor to enable the SoC to perform the following steps:
    receive a request for a trickplay operation at the DVR;
    obtain a plurality of descriptors for the requested trickplay operation from the DVR, wherein the plurality of descriptors include Broadcom Transport Packets (BTPs), wherein the plurality of descriptors further comprise:
    a startcode descriptor;
    a first BTP descriptor BTP0;
    a Sequence Parameter Set (SPS)/Picture Parameter Set (PPS) descriptor;
    a second BTP descriptor BTP1;
    first frame data excluding a last transport stream (TS) packet for the associated frame data;
    a third BTP descriptor BTP2; and
    second frame data including the last (TS) packet for the transport stream;
    prepare a single descriptor framework that combines the plurality of descriptors into a single combined descriptor;
    read frame data from memory of the DVR in a single memory read operation;
    combine the read frame data into the single combined descriptor; and
    provide the single combined descriptor through the decoder for playback on the video player device.

6. The apparatus of claim 5, wherein the descriptors comprise a plurality of BTP descriptors and a Sequence Parameter Set (SPS)/Picture Parameter (PPS) descriptor.

7. The apparatus of claim 5, wherein the trickplay operations are provided for data encoded using the MPEG-4 standard.

8. The apparatus of claim 5, wherein the memory further stores code to cause the SoC to perform the following additional step:
    decode using the decoder while altering decode processing speed so that descriptors are processed with a pace higher than remaining data, so that descriptors for each group of frame data are processed with a speed similar to a pace of processing a single MPEG-2 standard format descriptor.

* * * * *